US012603092B2

(12) United States Patent　(10) Patent No.:　US 12,603,092 B2
Lange et al.　(45) Date of Patent:　*Apr. 14, 2026

(54) AUTOMATED ASSISTANT CONTROL OF NON-ASSISTANT APPLICATIONS VIA IDENTIFICATION OF SYNONYMOUS TERM AND/OR SPEECH PROCESSING BIASING

(71) Applicant: GOOGLE LLC, Mountain View, CA (US)

(72) Inventors: Joseph Lange, Zurich (CH); Abhanshu Sharma, Zurich (CH); Adam Coimbra, Los Altos, CA (US); Gökhan Bakir, Zurich (CH); Gabriel Taubman, Brooklyn, NY (US); Ilya Firman, Sunnyvale, CA (US); Jindong Chen, Hillsborough, CA (US); James Stout, Sunnyvale, CA (US); Marcin Nowak-Przygodzki, Bäch (CH); Reed Enger, Maplewood, NJ (US); Thomas Weedon Hume, San Francisco, CA (US); Vishwath Mohan, Mountain View, CA (US); Jacek Szmigiel, Zurich (CH); Yunfan Jin, Sunnyvale, CA (US); Kyle Pedersen, Brooklyn, NY (US); Gilles Baechler, Zurich (CH)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/642,010

(22) Filed: Apr. 22, 2024

(65) Prior Publication Data

US 2024/0274132 A1　Aug. 15, 2024

Related U.S. Application Data

(63) Continuation of application No. 17/538,641, filed on Nov. 30, 2021, now Pat. No. 11,967,321.

(Continued)

(51) Int. Cl.
　*G10L 15/22*　(2006.01)
　*G06F 3/16*　(2006.01)
　(Continued)

(52) U.S. Cl.
　CPC .............. *G10L 15/22* (2013.01); *G06F 3/167* (2013.01); *G06F 40/247* (2020.01); *G06F 40/30* (2020.01);
　(Continued)

(58) Field of Classification Search
　CPC ........ G06F 3/167; G06F 40/247; G06F 40/30; G10L 15/22; G10L 15/12; G10L 15/1815;
　(Continued)

(56) References Cited

U.S. PATENT DOCUMENTS 11,967,321 B2 *　4/2024　Lange ................... G06F 40/247
2013/0311997 A1 *　11/2013　Gruber .................. G06F 9/4843
　　　　　　　　　　　　　718/102

(Continued)

FOREIGN PATENT DOCUMENTS

CN　　111145756　　5/2020
WO　　2021015801　　1/2021

OTHER PUBLICATIONS

European Patent Office; Communication pursuant to Article 94(3) EPC issued in Application No. 22800415.6, 7 pages; dated May 19, 2025.

(Continued)

*Primary Examiner* — Samuel G Neway
(74) *Attorney, Agent, or Firm* — Gray Ice Higdon

(57)　　ABSTRACT

Implementations set forth herein relate to an automated assistant that can interact with applications that may not have been pre-configured for interfacing with the automated assistant. The automated assistant can identify content of an application interface of the application to determine syn- (Continued)

onymous terms that a user may speak when commanding the automated assistant to perform certain tasks. Speech processing operations employed by the automated assistant can be biased towards these synonymous terms when the user is accessing an application interface of the application. In some implementations, the synonymous terms can be identified in a responsive language of the automated assistant when the content of the application interface is being rendered in a different language. This can allow the automated assistant to operate as an interface between the user and certain applications that may not be rendering content in a native language of the user.

20 Claims, 7 Drawing Sheets

Related U.S. Application Data

(60) Provisional application No. 63/252,894, filed on Oct. 6, 2021.

(51) Int. Cl.
| | |
|---|---|
| *G06F 40/247* | (2020.01) |
| *G06F 40/30* | (2020.01) |
| *G10L 15/12* | (2006.01) |
| *G10L 15/18* | (2013.01) |
| *G10L 15/183* | (2013.01) |

(52) U.S. Cl.
CPC .......... *G10L 15/12* (2013.01); *G10L 15/1815* (2013.01); *G10L 15/1822* (2013.01); *G10L 15/183* (2013.01); *G10L 2015/223* (2013.01); *G10L 2015/228* (2013.01)

(58) Field of Classification Search
CPC ............... G10L 15/183; G10L 15/1822; G10L 2015/223; G10L 2015/228
See application file for complete search history.

(56) References Cited

U.S. PATENT DOCUMENTS

| | | | | |
|---|---|---|---|---|
| 2016/0171980 | A1* | 6/2016 | Liddell | .................... G10L 15/22 |
| | | | | 704/275 |
| 2016/0239568 | A1* | 8/2016 | Packer | ................... G06F 16/951 |
| 2016/0335138 | A1* | 11/2016 | Surti | .................... G06F 9/44526 |
| 2017/0358303 | A1* | 12/2017 | Walker, II | ........... G10L 15/1815 |
| 2017/0374176 | A1* | 12/2017 | Agrawal | ............ G06Q 30/0269 |
| 2018/0196683 | A1* | 7/2018 | Radebaugh | ........... G06F 16/245 |
| 2018/0247654 | A1* | 8/2018 | Bhaya | .................... G06F 40/205 |
| 2020/0356339 | A1* | 11/2020 | Krishnan | .................. G06F 9/54 |
| 2020/0395018 | A1 | 12/2020 | Burakov et al. | |
| 2023/0103677 | A1* | 4/2023 | Lange | ..................... G06F 40/30 |
| | | | | 704/275 |
| 2024/0274132 | A1* | 8/2024 | Lange | ................... G06F 40/247 |

OTHER PUBLICATIONS

European Patent Office; International Search Report and Written Opinion issued in Application No. PCT/US2022/045512; 20 pages; dated Feb. 28, 2023.
European Patent Office; Invitation to Pay Additional Fees issued in Application No. PCT/US2022/045512; 12 pages; dated Jan. 3, 2023.

* cited by examiner

300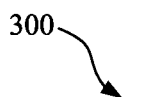

COMPUTING DEVICE
302

ASSISTANT INTERFACE
320

APPLICATIONS
334

APPLICATION DATA
330

DEVICE DATA
332

CONTEXTUAL DATA
336

AUTOMATED ASSISTANT
304

INPUT PROCESSING ENGINE
306

SPEECH PROCESSING ENGINE
308

DATA PARSING ENGINE
310

PARAMETER ENGINE
312

ASSISTANT DATA
338

TERM IDENTIFICATION ENGINE
316

SYNONYMOUS TERM ENGINE
318

SPEECH BIASING ENGINE
326

APPLICATION COMMAND ENGINE
324

OUTPUT GENERATING ENGINE
314

ASSISTANT INVOCATION ENGINE
322

FIG. 3

AUTOMATED ASSISTANT CONTROL OF NON-ASSISTANT APPLICATIONS VIA IDENTIFICATION OF SYNONYMOUS TERM AND/OR SPEECH PROCESSING BIASING

BACKGROUND

Humans may engage in human-to-computer dialogs with interactive software applications referred to herein as "automated assistants" (also referred to as "digital agents," "chatbots," "interactive personal assistants," "intelligent personal assistants," "assistant applications," "conversational agents," etc.). For example, humans (which when they interact with automated assistants may be referred to as "users") may provide commands and/or requests to an automated assistant using spoken natural language input (i.e., utterances), which may in some cases be converted into text and then processed, and/or by providing textual (e.g., typed) natural language input.

In some instances, an automated assistant can be used to interact with webpages and/or other applications that are separate from the automated assistant. Although this can enhance the utility of the automated assistant, functionality of the automated assistant in such circumstances can be limited to webpages and/or applications that are rendered in a native language of a user and/or a primary language of the automated assistant. As a result, a user that comes across an application interface that conveys content in a non-native language of the user may be limited in how they can employ their automated assistant to interact with the application interface. For instance, a user may have to frequently switch between employing their automated assistant to interact with the application and manually interacting with the application via touch interface, which can waste resources at the computing device providing access to the automated assistant.

SUMMARY

Implementations set forth herein relate to an automated assistant that can receive inputs for interacting with an application interface of an application that may not be pre-configured for interfacing with the automated assistant. For example, the application may not be pre-configured at all for interfacing with the automated assistant or, alternatively, can have only a subset of its full functionalities pre-configured for interfacing with the automated assistant. Alternatively, or additionally, in some implementations the automated assistant can interface with an application interface that conveys content in a second language that is different from a first language (e.g., a responding language) with which the user primarily interacts with their automated assistant. The application interface can correspond to an application that is different from the automated assistant, such as an internet browser application or other non-assistant application. For example, the application interface can correspond to a city guide application that may not be pre-configured for interfacing with the automated assistant. Regardless, the automated assistant can process data corresponding to content rendered at an application interface of the city guide application when a user is accessing the city guide application. The content can include word(s), phrase (s), image(s), symbol(s), and/or other information that can be used by the automated assistant to identify controllable features of the city guide application.

The automated assistant can process content of the application interface to identify correlations between one or more features of the application interface and one or more operations that are each capable of being performed by the automated assistant and that each effectuate corresponding control of the application (e.g., through emulating input(s) and/or through interfacing with an API of the application). Although, in some instances, an application may be pre-configured to be initialized by the automated assistant in response to an open command (e.g., "Assistant, open my city guide application."), the application may not be pre-configured for enabling any other interactions with the automated assistant. In some implementations, one or more images (e.g., a screen shot) and/or other data capturing the content of an application interface can be processed to identify certain features of the application interface. Alternatively, or additionally, code corresponding to the application interface can be accessed by the automated assistant to identify certain features of the application that a user can interact with and/or control.

For instance, a city guide application can render an application interface that includes a link for navigating to an event calendar. Based on a screen shot of the application interface and/or underlying code (e.g., XML, HTML, Python, Javascript, etc.) that enables the application interface, the automated assistant can determine that the application interface includes the event calendar link, and that the event calendar link is selectable via a touch input to a touch interface of the computing device. The automated assistant can operate as an interface for the application by identifying one or more terms (e.g., schedule, calendar, planner, etc.) that are synonymous with the term(s) (e.g., calendar) associated with the link, and causing selection of the link based at least in part on determining that a spoken utterance, from the user, includes the term(s) or one of the synonymous terms.

In some implementations, speech processing of the automated assistant can be biased toward these one or more terms (i.e., the term(s) and/or the synonymous term(s)) at least when the user is viewing the application interface and/or otherwise interacting with the city guide application. In these and other manners, more accurate speech recognition can be performed on a spoken utterance of the user that includes one or more of the term(s). This results in efficient voice-based control of the application via the automated assistant and, further, mitigates occurrences of misrecognition in speech processing. Occurrences of misrecognition can result in a failed attempt to control the application (and waste of resource(s) in processing the spoken utterance) and/or can cause additional user interface input(s) to need to be provided in controlling the application.

In some implementations, historical usage data for other applications can be utilized for biasing and/or otherwise allowing a user to employ their automated assistant to engage with a particular application that may not be pre-configured to interface with the automated assistant. For example, and with prior permission from the user, historical usage data can be processed to identify terms that are synonymous with content for an application interface of the particular application. For instance, a user may have a history of invoking their automated assistant using a spoken utterance such as, "Assistant, see events," when viewing a social media application that provides a calendar interface that includes the term "Calendar." The automated assistant can therefore determine that this spoken utterance and/or the term "events" can be synonymous with "calendar." Based on this determination, when the user provides the spoken utterance, "Assistant, see events," while viewing their city guide application, the automated assistant can, in response, select a button that is labeled "calendar" at an interface of the city guide application.

Alternatively, or additionally, the automated assistant can determine that a particular application that is not pre-configured for interfacing with the automated assistant is similar to one or more other applications. Based on this determination, the automated assistant can identify content and/or data associated with the similar applications in order to identify terms that speech processing can be biased toward while the user is accessing the particular application. For example, and with prior permission from the user, the automated assistant can determine that the city guide application has content that is similar to content of one or more social media applications accessed by the user. Based on this determination, the automated assistant can cause speech processing to be biased towards terms identified in the content of the social media application when the user is accessing the city guide application. This can reduce errors in speech recognition when a user is interacting with a new application that has limited functionality for interfacing with the automated assistant. For instance, requests for the automated assistant to select certain links in the new application can be understood more accurately by the automated assistant, thereby allowing the automated assistant to provide more effective commands to the operating system for interacting with the new application.

In some implementations, the automated assistant can be set to be responsive to a first language (e.g., a responding language) of the user while the user is interfacing with an application that is rendering content in a second language. For example, when the user is viewing a shopping website, an image of the interface of the shopping website can be processed to identify second language words and/or second language phrases that can characterize each respective feature of the shopping website. For instance, a page related to "inventory" can be linked under a subheading that includes a second language reference (e.g., "inventario") to the subject of "inventory." Alternatively, or additionally, the page related to inventory can be linked under a subheading that includes a non-natural language symbol (e.g., an image of a warehouse) that is a reference to the subject of inventory.

When the user is viewing the application interface, the user can provide, in the first language, a spoken utterance to the automated assistant in furtherance of selecting the "inventory" related link. The spoken utterance can be, for example, "Assistant, inventory." In response to receiving the spoken utterance, the automated assistant can determine whether content of the spoken utterance relates to any of the first language words or phrases identified by the automated assistant as corresponding to the second language content of the application interface. For example, a translation of the non-natural language symbol and/or second language reference to the term "inventory" can yield one or more terms (e.g., "inventario") that refer to "inventory" in the first language of the user. Based on the one or more terms, the automated assistant can determine that the spoken utterance, "Assistant, inventory," is a request for the automated assistant to open an inventory page of the application.

In some implementations, the automated assistant can bias speech processing based on content of one or more interfaces of an application. For example, the user can view a shopping application that the user had not previously interacted with, and that is being rendered in a second language that is different than the preferred first language of the user. The automated assistant can process data characterizing content of an application interface of the shopping application in order to identify first language terms that can refer to portions of the application interface. For example, reviews of a certain product can be rendered at the interface of the application in the second language, and one or more terms (e.g., "feedback," "comments," etc.) in the first language can refer to the reviews in the second language (e.g., "comentarios", "criticas," etc.). Speech processing performed for interpreting inputs from the user can be biased toward the one or one more terms in the first language, in order that the automated assistant can be readily responsive to inputs directed to the shopping application.

For example, a link to a "reviews" page can be rendered at the application interface in the second language, and the automated assistant can be set to interact with the user in a first language. When the user accesses the application interface, content of the application interface can be processed such that one or more terms (e.g., "feedback," "comments," etc.) synonymous with "reviews" can be identified in the first language. One or more natural language understanding (NLU) and/or automatic speech recognition (ASR) processes can be biased toward the one or more first language terms (e.g., reviews, comments, critiques, feedback, etc.) synonymous with "reviews." When the user provides a spoken utterance such as, "Assistant, show feedback," in the first language, the automated assistant can process audio data corresponding to the spoken utterance with a bias toward the one or more first language terms (e.g., reviews, comments, feedback, critiques, etc.). In this way, the user can interact with the application interface via their automated assistant in their preferred language (e.g., the first language).

The above description is provided as an overview of some implementations of the present disclosure. Further description of those implementations, and other implementations, are described in more detail below.

Other implementations may include a non-transitory computer readable storage medium storing instructions executable by one or more processors (e.g., central processing unit(s) (CPU(s)), graphics processing unit(s) (GPU(s)), and/or tensor processing unit(s) (TPU(s)) to perform a method such as one or more of the methods described above and/or elsewhere herein. Yet other implementations may include a system of one or more computers that include one or more processors operable to execute stored instructions to perform a method such as one or more of the methods described above and/or elsewhere herein.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

BRIEF DESCRIPTION OF THE DRAWINGS

FIG. 3 illustrates a system for operating an automated assistant to control applications that may not be pre-configured to interface with the automated assistant.

DETAILED DESCRIPTION

Figure 1A:
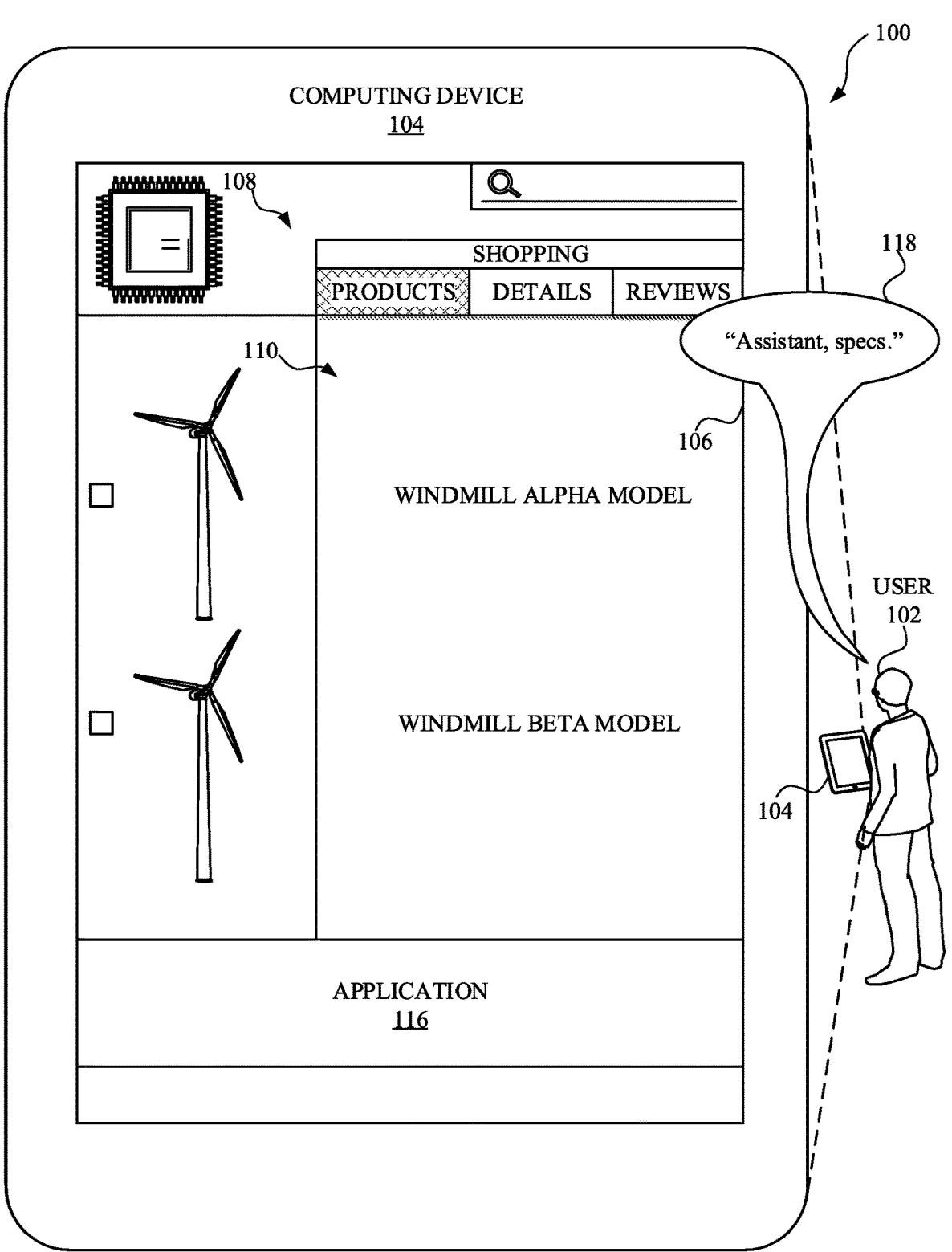
FIG. 1A and FIG. 1B illustrate a views of a user interacting with an automated assistant to control an application that is not pre-configured, or entirely pre-configured, for interactions with the automated assistant.
Figure 1B:
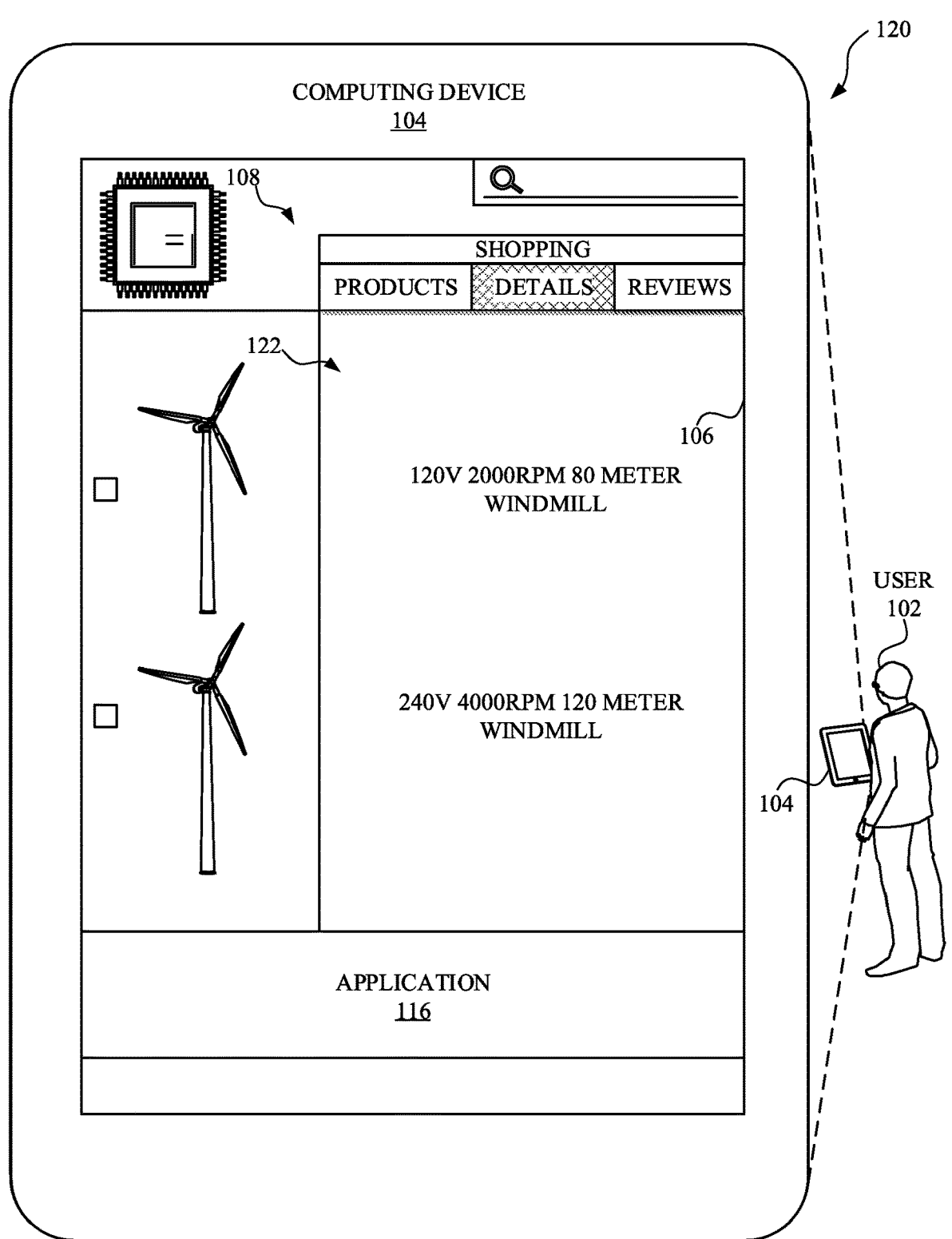

FIG. 1A and FIG. 1B illustrate a view 100 and a view 120 of a user 102 interacting with an automated assistant to control an application 116 that is not pre-configured, or entirely pre-configured, for interactions with the automated assistant. The user 102 can access the application 116 via a computing device 104 that also provides access to the automated assistant. The application 116 can be a shopping application that can be launched by tapping an application icon being rendered at a display interface 106 of the computing device 104. When the application 116 is launched, the user 102 can shop for various products that are listed and selectable at the display interface 106. For instance, the user 102 can tap a "products" link at a portion 108 of the application 106 in order to view labels 110 detailing names of products that can be purchased via the application 106.

In some implementations, the automated assistant and/or other application can process data associated with the application 116 to determine terms synonymous with various content being rendered at the display interface 106. For example, the portion 108 of the application 116 can include links to show "products," product "details," and product "reviews." The terms (e.g., "products," "details," and "reviews," etc.) corresponding to these links can be processed to identify other terms synonymous with these terms. For example, terms synonymous with "details" can include "specifications," "factors," "ingredients," and "components." In some implementations, these synonymous terms can be identified based on historical interaction data. The historical interaction data can characterize prior interactions between the user 102 and the automated assistant, and/or the user 102 and another application. For example, the user 102 may use the command, "Assistant, show ingredients," to view a "details" page of another application. Therefore, the automated assistant can identify the term "ingredients" as being synonymous with the term "details."

In some implementations, the automated assistant can cause one or more speech processing techniques to be biased toward the identified terms. In this way, the automated assistant may provide more accurate responses when the user 102 is attempting to interact with the application 106 via their automated assistant. For example, the user 102 can provide a spoken utterance 118 such as, "Assistant, specs," in order to indicate to the automated assistant that the user 102 would like to select the "details" link in the portion 108 of the application interface. In response to receiving the spoken utterance, the automated assistant can perform NLU and/or ASR processing, which can optionally be biased toward the identified terms. For instance, the automated assistant can determine that the user 102 included the term "specs" in the spoken utterance, and that the term "specs" is synonymous with the term "details."

In some implementations, the automated assistant can determine that the term "details" corresponds to an operation capable of being performed via the application 116. For example, a variety of content can be rendered at the display interface 106 and some of the content can correspond to operations (e.g., navigating to another page, selecting an item to purchase, etc.). When the user 102 is determined to have provided a spoken utterance that is associated with an operation capable of being performed via the application 116, the automated assistant can generate operation data. The operation data can be submitted to an operation system or other application of the computing device 104 to cause the intended operation selecting the "details" link to be performed. For instance, and as illustrated in view 120 of FIG. 1B, in response to the spoken utterance 118, the automated assistant can cause the "details" link to be selected and a details section 122 to be rendered at the display interface 106.

Figure 2A:
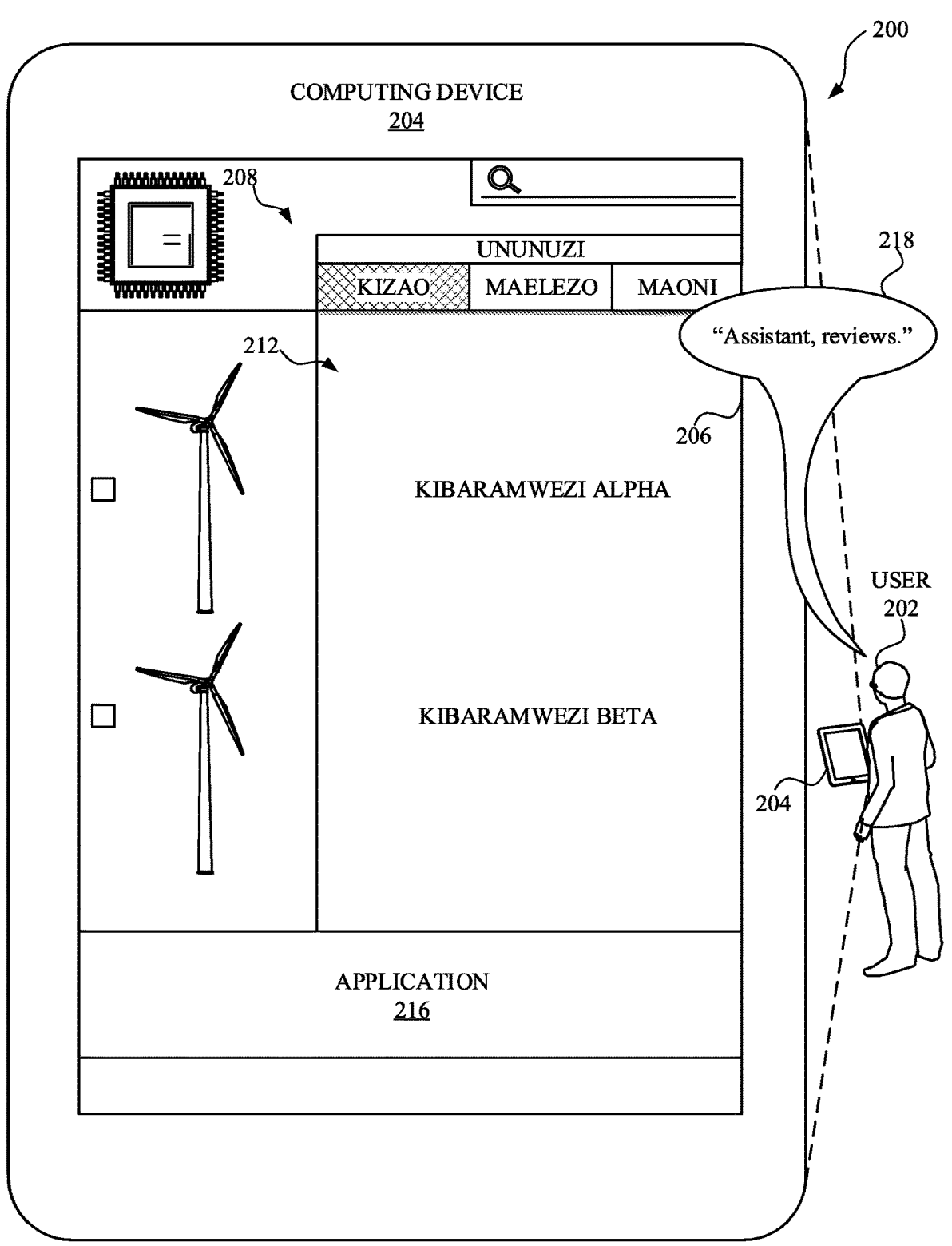
FIG. 2A and FIG. 2B illustrate a view of a user interacting with an automated assistant to control an application that is being rendered in a language that is different than a set language for the automated assistant, and that is not pre-configured for interfacing with the automated assistant.
Figure 2B:
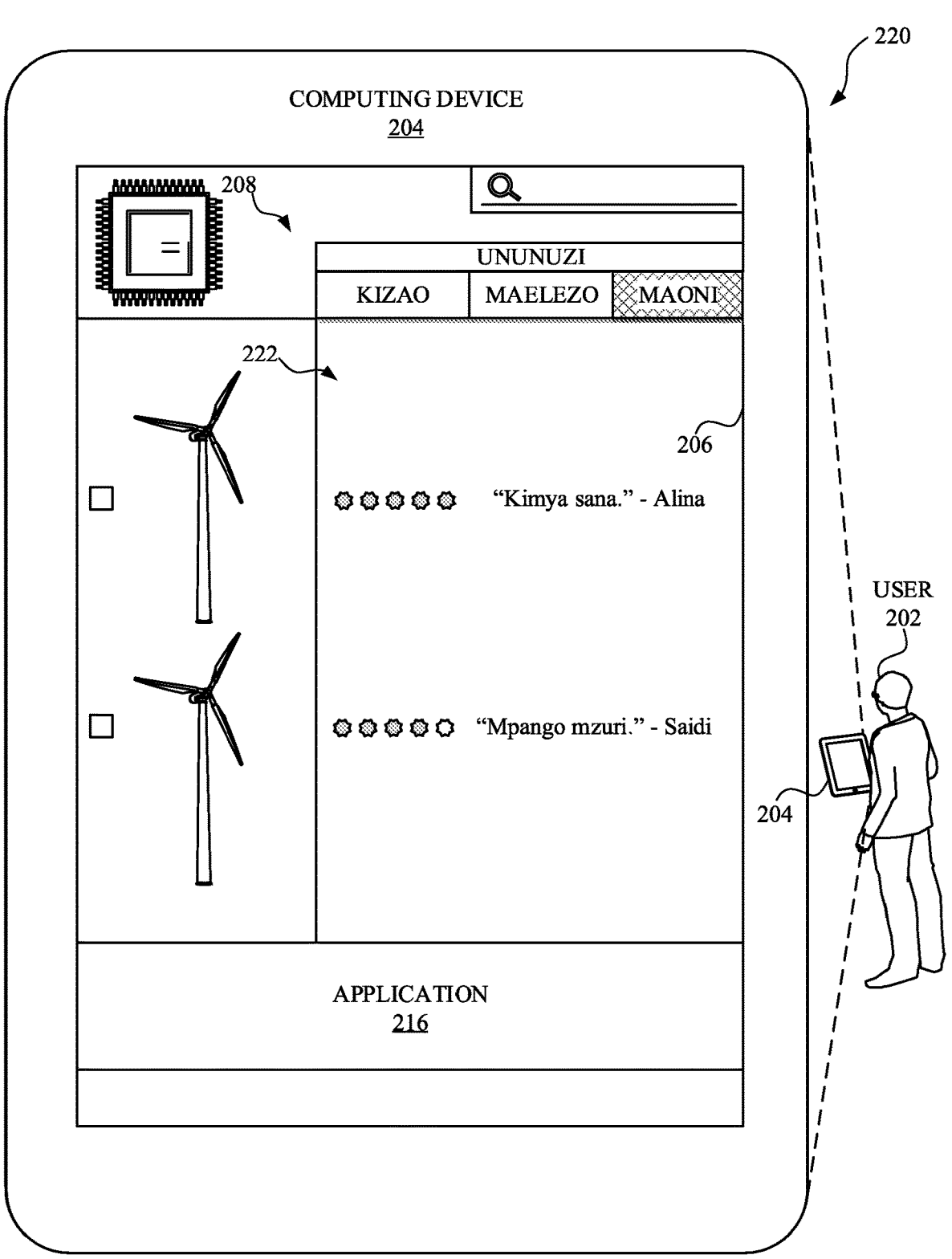

FIG. 2A and FIG. 2B illustrate a view 200 and a view 220 of a user 202 interacting with an automated assistant to control an application 216 that is being rendered in a language that is different than a set language for the automated assistant, and that is not pre-configured for interfacing with the automated assistant. The application 216 can be available via a computing device 204, which also provides access to the automated assistant. The application 216 can be a shopping application that allows the user 202 to shop for particular devices (e.g., windmills) that are provided from a variety of different countries. As a result, the application 216 may render content at a display interface 206 in a language, such as Swahili, which may not be a primary language of the user 202 and/or a set language for the automated assistant.

Though the application 216 may render content in another language (e.g., Swahili), the user 202 can provide spoken utterances in a set language (e.g., English) of the automated assistant to cause the automated assistant to interact with the application 216. The automated assistant can be set to respond to the set language according to a user-controllable setting. In some implementations, the automated assistant can process data associated with application content being rendered at the display interface 206 to determine a language that the content is being rendered in. Alternatively, or additionally, the data can be processed to identify one or more operations capable of being performed by the automated assistant to interact with the application 216. For example, application code (e.g., XML, HTML, Javascript, Python, etc.) can be processed to identify portions of an application interface and/or application that the user 202 can interact with and/or select.

When the automated assistant identifies a portion 208 of the application interface that is selectable via a user input, the automated assistant can identify operations and/or terms associated with the portion 208 of the application interface. For example, automated assistant can determine that the term "Kizao" is associated with a link that is being rendered at the display interface 206. The automated assistant and/or other application can determine that the term "Kizao" is Swahili for "product." Based on this determination, the automated assistant can identify one or more other terms synonymous with the term "product" and/or "kizao." The automated assistant can perform this operation for other terms being rendered at the application interface, such as "maelezo" and "maoni." As a result, the automated assistant can have a set of terms synonymous with each selectable element of an application interface of the application 216. For example, the term "maoni" can translate to "comments," and the term "comments" can be synonymous with other terms such as "reviews" and "feedback."

In some implementations, when the automated assistant has identified one or more terms associated with a selectable feature of the application 216, the automated assistant can bias speech processing toward the one or more terms. For example, NLU and/or ASR processing can be biased toward the terms "reviews" and "feedback." In this way, the automated assistant can be more accurately responsive to user inputs that may be directed to controlling an application that may be rendered in another language. For instance, the user 202 can provide a spoken utterance 218 such as, "Assistant, reviews," when the user 202 is viewing a list 212 of "products" or "kizao" via the application 216. In response, the automated assistant can determine that the term "reviews" is synonymous with the selectable feature labeled "maoni" being rendered at the display interface 206. Based on this determination, the automated assistant can identify one or more operations that can be initialized by the automated assistant to interact with the selectable feature.

For example, the automated assistant can cause operation data to be submitted to an operating system of the computing device 204 to cause the "maoni" link of the application 216 to be selected. In response to the selection of the link, application 216 can transition to rendering a list 222 of "reviews" at the display interface 206. In some instance, although the user 202 may not be able to quickly read the language of the content, the user 202 will be able to understand certain content (e.g., 5 out of 5 star reviews) of applications 216 without every user input being translated. This can allow the user 202 to interact with a variety of different applications that may not be in a primary language of the user 202.

FIG. 3 illustrates a system 300 for operating an automated assistant 304 to control applications 334 that may not be pre-configured to interface with the automated assistant 304. The automated assistant 304 can operate as part of an assistant application that is provided at one or more computing devices, such as a computing device 302 and/or a server device. A user can interact with the automated assistant 304 via assistant interface(s) 320, which can be a microphone, a camera, a touch screen display, a user interface, and/or any other apparatus capable of providing an interface between a user and an application. For instance, a user can initialize the automated assistant 304 by providing a verbal, textual, and/or a graphical input to an assistant interface 320 to cause the automated assistant 304 to initialize one or more actions (e.g., provide data, control a peripheral device, access an agent, generate an input and/or an output, etc.). Alternatively, the automated assistant 304 can be initialized based on processing of contextual data 336 using one or more trained machine learning models. The contextual data 336 can characterize one or more features of an environment in which the automated assistant 304 is accessible, and/or one or more features of a user that is predicted to be intending to interact with the automated assistant 304. The computing device 302 can include a display device, which can be a display panel that includes a touch interface for receiving touch inputs and/or gestures for allowing a user to control applications 334 of the computing device 302 via the touch interface. In some implementations, the computing device 302 can lack a display device, thereby providing an audible user interface output, without providing a graphical user interface output. Furthermore, the computing device 302 can provide a user interface, such as a microphone, for receiving spoken natural language inputs from a user. In some implementations, the computing device 302 can include a touch interface and can be void of a camera, but can optionally include one or more other sensors.

The computing device 302 and/or other third party client devices can be in communication with a server device over a network, such as the internet. Additionally, the computing device 302 and any other computing devices can be in communication with each other over a local area network (LAN), such as a Wi-Fi network. The computing device 302 can offload computational tasks to the server device in order to conserve computational resources at the computing device 302. For instance, the server device can host the automated assistant 304, and/or computing device 302 can transmit inputs received at one or more assistant interfaces 320 to the server device. However, in some implementations, the automated assistant 304 can be hosted at the computing device 302, and various processes that can be associated with automated assistant operations can be performed at the computing device 302.

In various implementations, all or less than all aspects of the automated assistant 304 can be implemented on the computing device 302. In some of those implementations, aspects of the automated assistant 304 are implemented via the computing device 302 and can interface with a server device, which can implement other aspects of the automated assistant 304. The server device can optionally serve a plurality of users and their associated assistant applications via multiple threads. In implementations where all or less than all aspects of the automated assistant 304 are implemented via computing device 302, the automated assistant 304 can be an application that is separate from an operating system of the computing device 302 (e.g., installed "on top" of the operating system)—or can alternatively be implemented directly by the operating system of the computing device 302 (e.g., considered an application of, but integral with, the operating system).

In some implementations, the automated assistant 304 can include an input processing engine 306, which can employ multiple different modules for processing inputs and/or outputs for the computing device 302 and/or a server device. For instance, the input processing engine 306 can include a speech processing engine 308, which can process audio data received at an assistant interface 320 to identify the text embodied in the audio data. The audio data can be transmitted from, for example, the computing device 302 to the server device in order to preserve computational resources at the computing device 302. Additionally, or alternatively, the audio data can be exclusively processed at the computing device 302.

The process for converting the audio data to text can include a speech recognition algorithm, which can employ neural networks, and/or statistical models for identifying groups of audio data corresponding to words or phrases. The text converted from the audio data can be parsed by a data parsing engine 310 and made available to the automated assistant 304 as textual data that can be used to generate and/or identify command phrase(s), intent(s), action(s), slot value(s), and/or any other content specified by the user. In some implementations, output data provided by the data parsing engine 310 can be provided to a parameter engine 312 to determine whether the user provided an input that corresponds to a particular intent, action, and/or routine capable of being performed by the automated assistant 304 and/or an application or agent that is capable of being accessed via the automated assistant 304. For example, assistant data 338 can be stored at the server device and/or the computing device 302, and can include data that defines one or more actions capable of being performed by the automated assistant 304, as well as parameters necessary to perform the actions. The parameter engine 312 can generate one or more parameters for an intent, action, and/or slot value, and provide the one or more parameters to an output generating engine 314. The output generating engine 314 can use the one or more parameters to communicate with an assistant interface 320 for providing an output to a user, and/or communicate with one or more applications 334 for providing an output to one or more applications 334.

In some implementations, the automated assistant 304 can be an application that can be installed "on-top of" an operating system of the computing device 302 and/or can itself form part of (or the entirety of) the operating system of the computing device 302. The automated assistant application includes, and/or has access to, on-device speech recognition, on-device natural language understanding, and on-device fulfillment. For example, on-device speech recognition can be performed using an on-device speech recognition module that processes audio data (detected by the microphone(s)) using an end-to-end speech recognition machine learning model stored locally at the computing device 302. The on-device speech recognition generates recognized text for a spoken utterance (if any) present in the audio data. Also, for example, on-device natural language understanding (NLU) can be performed using an on-device NLU module that processes recognized text, generated using the on-device speech recognition, and optionally contextual data, to generate NLU data.

NLU data can include intent(s) that correspond to the spoken utterance and optionally parameter(s) (e.g., slot values) for the intent(s). On-device fulfillment can be performed using an on-device fulfillment module that utilizes the NLU data (from the on-device NLU), and optionally other local data, to determine action(s) to take to resolve the intent(s) of the spoken utterance (and optionally the parameter(s) for the intent). This can include determining local and/or remote responses (e.g., answers) to the spoken utterance, interaction(s) with locally installed application(s) to perform based on the spoken utterance, command(s) to transmit to internet-of-things (IoT) device(s) (directly or via corresponding remote system(s)) based on the spoken utterance, and/or other resolution action(s) to perform based on the spoken utterance. The on-device fulfillment can then initiate local and/or remote performance/execution of the determined action(s) to resolve the spoken utterance.

In various implementations, remote speech processing, remote NLU, and/or remote fulfillment can at least selectively be utilized. For example, recognized text can at least selectively be transmitted to remote automated assistant component(s) for remote NLU and/or remote fulfillment. For instance, the recognized text can optionally be transmitted for remote performance in parallel with on-device performance, or responsive to failure of on-device NLU and/or on-device fulfillment. However, on-device speech processing, on-device NLU, on-device fulfillment, and/or on-device execution can be prioritized at least due to the latency reductions they provide when resolving a spoken utterance (due to no client-server roundtrip(s) being needed to resolve the spoken utterance). Further, on-device functionality can be the only functionality that is available in situations with no or limited network connectivity.

In some implementations, the computing device 302 can include one or more applications 334 which can be provided by a third-party entity that is different from an entity that provided the computing device 302 and/or the automated assistant 304. An application state engine of the automated assistant 304 and/or the computing device 302 can access application data 330 to determine one or more actions capable of being performed by one or more applications 334, as well as a state of each application of the one or more applications 334 and/or a state of a respective device that is associated with the computing device 302. A device state engine of the automated assistant 304 and/or the computing device 302 can access device data 332 to determine one or more actions capable of being performed by the computing device 302 and/or one or more devices that are associated with the computing device 302. Furthermore, the application data 330 and/or any other data (e.g., device data 332) can be accessed by the automated assistant 304 to generate contextual data 336, which can characterize a context in which a particular application 334 and/or device is executing, and/or a context in which a particular user is accessing the computing device 302, accessing an application 334, and/or any other device or module.

While one or more applications 334 are executing at the computing device 302, the device data 332 can characterize a current operating state of each application 334 executing at the computing device 302. Furthermore, the application data 330 can characterize one or more features of an executing application 334, such as content of one or more graphical user interfaces being rendered at the direction of one or more applications 334. Alternatively, or additionally, the application data 330 can characterize an action schema, which can be updated by a respective application and/or by the automated assistant 304, based on a current operating status of the respective application. Alternatively, or additionally, one or more action schemas for one or more applications 334 can remain static, but can be accessed by the application state engine in order to determine a suitable action to initialize via the automated assistant 304.

The computing device 302 can further include an assistant invocation engine 322 that can use one or more trained machine learning models to process application data 330, device data 332, contextual data 336, and/or any other data that is accessible to the computing device 302. The assistant invocation engine 322 can process this data in order to determine whether or not to wait for a user to explicitly speak an invocation phrase to invoke the automated assistant 304, or consider the data to be indicative of an intent by the user to invoke the automated assistant—in lieu of requiring the user to explicitly speak the invocation phrase. For example, the one or more trained machine learning models can be trained using instances of training data that are based on scenarios in which the user is in an environment where multiple devices and/or applications are exhibiting various operating states. The instances of training data can be generated in order to capture training data that characterizes contexts in which the user invokes the automated assistant and other contexts in which the user does not invoke the automated assistant. When the one or more trained machine learning models are trained according to these instances of training data, the assistant invocation engine 322 can cause the automated assistant 304 to detect, or limit detecting, spoken invocation phrases from a user based on features of a context and/or an environment.

In some implementations, the system 300 can include a term identification engine 316 that can process content of one or more applications 334 to determine whether the content includes terms that are associated with application operations. In other words, the term identification engine 316 can determine whether a term being rendered by an application 334 corresponds to an operation that a user can control by interacting with the application 334. In some implementations, these terms can be identified by processing image data, such as screenshots or other data, to identify locations of certain terms at an interface and selectable features of the interface. Alternatively, or additionally, the term identification engine 316 can process other application data, such as code that is executable by an operating system or other computing system, to identify terms that correspond to user-controllable features of an application 334.

The terms identified by the term identification engine 316 can be provided to a synonymous term engine 318, which can determine other terms that may be synonymous with the terms identified by the term identification engine 316. In some implementations, the other terms identified by the synonymous term engine 318 can be in a different language than a language of the terms identified by the term identification engine 316. For example, the automated assistant 304 can provide outputs in a responsive language that is user-customizable via a setting of the automated assistant 304. However, the term identification engine 316 may identify terms of an application 334 that may be in another language that is different from the responsive language. In this way, the user can interact with the automated assistant in the responsive language (e.g., a native language of the user) in order to control an application that may be in a different language. In some implementations, synonymous terms can be identified through language libraries of the automated assistant 304, one or more servers in communication with the automated assistant 304, other applications and/or internet resources, application programming interfaces available to the automated assistant 304, and/or any other source for natural language assistance.

In some implementations, the system 300 can include a speech biasing engine 326 that can bias one or more different speech processing operations toward terms identified by the term identification engine 316 and/or the synonymous term engine 318. The speech biasing engine 326 can bias speech processing operations according to when a user is accessing a particular application 334 and/or particular application interface. For example, the speech biasing engine 326 can bias toward a first set of terms when the user is accessing a first application interface and a second set of terms, that are different than the first set of terms, when the user is accessing a second application that is different than the first application. In this way, the automated assistant can provide more accurate responses when the user is accessing an application 334 that may not be entirely pre-configured for interfacing with the automated assistant 304.

In some implementations, the system 300 can include an application command engine 324 that can cause an application 334 to perform one or more operations in response to a user providing an input that is associated with one or more identified terms. For example, when a spoken utterance from a user is determined to correspond to a selectable portion of an application 334, the application command engine 324 can generate command data for providing to an operating system of the computing device 302. The command data can be generated by the automated assistant to correspond to input that the operating system would receive if the user had directly selected the selectable portion of the application 334 (e.g., via a touch input to a touch display). Therefore, when the operating system receives the command data, the application 334 can receive a command for initializing an operation for controlling the selectable portion of the application 334. In this way, the user can interact with application 334 that may be entirely pre-configured for interfacing with the automated assistant 304 and/or may not be presented in a native language of the user.

Figure 4:
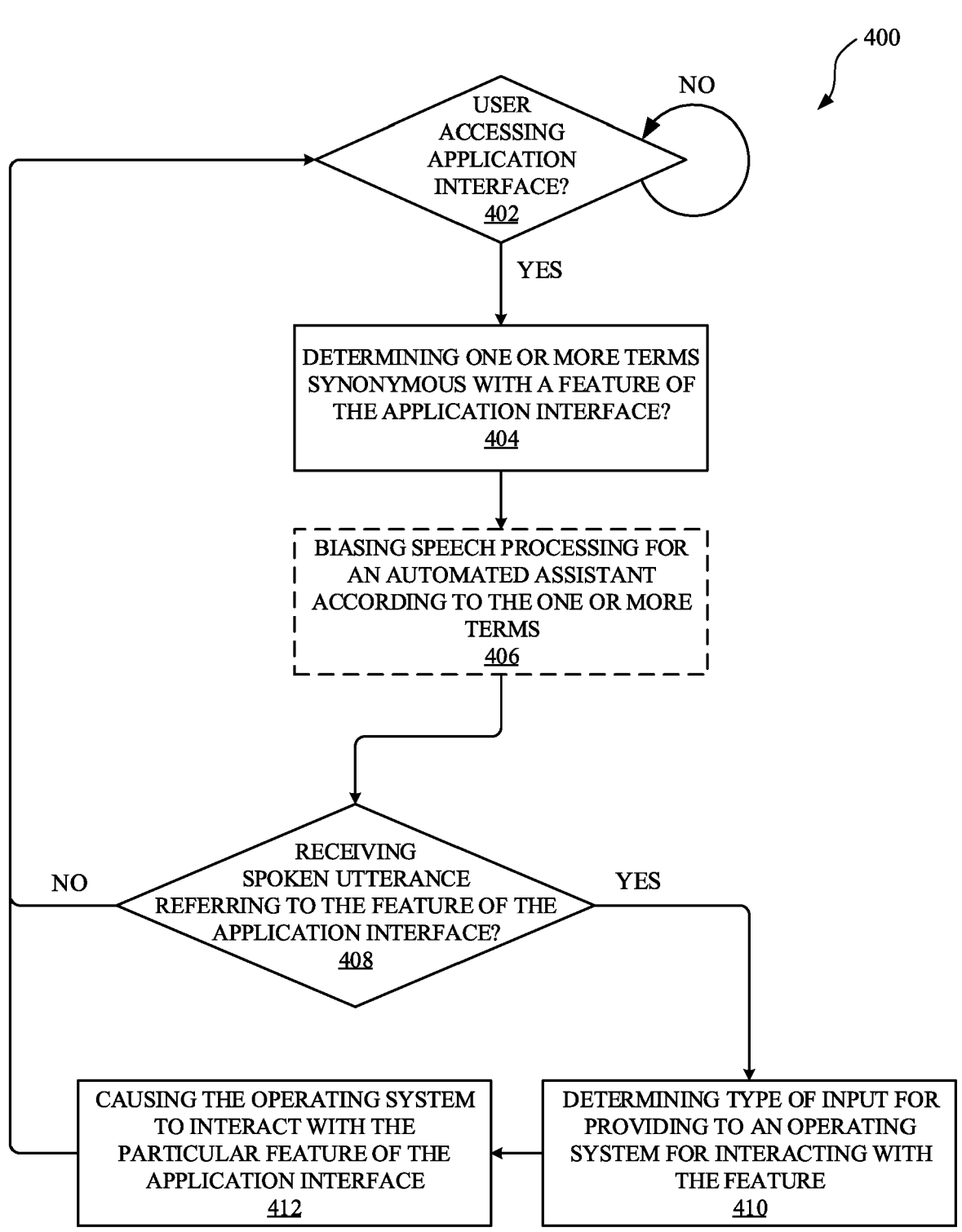
FIG. 4 illustrates a method for operating an automated assistant to control applications that may not be pre-configured to interface with the automated assistant.

FIG. 4 illustrates a method 400 for operating an automated assistant to control applications that may not be pre-configured to interface with the automated assistant. The method 400 can be performed by one or more computing devices, applications, and/or any other apparatus or module that can be associated with an automated assistant. The method 400 can include an operation 402 of determining whether the user is accessing an application interface of an application that is separate from the automated assistant. The operation 402 can optionally include determining whether the application interface corresponds to an application that is not pre-configured to allow the automated assistant to control various different functions of the application. For example, an application may not be pre-configured to interact with the automated assistant when the application is only pre-configured to be opened by the automated assistant, but not pre-configured to control other operations of the application. When the user is determined to be accessing the application interface, the method 400 can proceed from the operation 402 to an operation 404. Otherwise, the operation 402 can be performed until the user accesses such an application interface.

The operation 404 can include determining one or more terms that are synonymous with a feature of the application interface. In some implementations, the operation 404 can include determining whether one or more features of the application interface are selectable by a user, and any selectable features can be analyzed to identify one or more terms synonymous with the selectable features. A feature of the application interface can include a selectable link to a "reviews" portion of the application, which can be a computer shopping application. By selecting the selectable link, the computer shopping application can navigate to a review page where customers of the computing shopping application have submitted reviews (e.g., selecting a number of stars out of 5 stars) for various computer hardware. The automated assistant can determine that a link is selectable based on data that is available to the automated assistant, such as HTML code, XML code, document object model (DOM) data, application programming interface (API) data, and/or any other information that can indicate whether certain features of an application interface are selectable.

In some implementations, the automated assistant can identify one or more terms that are synonymous with a feature of an application interface by processing application data and/or other historical data associated with the automated assistant. This data can indicate whether the user has provided certain terms in their inputs to the automated assistant when referring to other features of other applications. The automated assistant can determine whether these other features are related to the feature subject to the operation 404. When another feature of another application is associated with the feature that is being analyzed in operation 404, the automated assistant can identify the certain terms previously used by the user to refer to this other feature. These certain terms can therefore be considered synonymous with the feature that is being subject to the operation 404. In some implementations, terms that are synonymous with the feature of the application interface can be identified using one or more heuristic processes and/or one or more trained machine learning models. For example, an image recognition process can be employed for identifying terms that characterize the feature of the application interface.

The method 400 can proceed from the operation 404 to an optional operation 406, which can include biasing speech processing for the automated assistant according to the one or more terms. For example, processing spoken inputs to the automated assistant can be performed using automatic speech recognition (ASR) and/or natural language understanding (NLU) techniques. When one or more terms synonymous with the feature of the application are identified, these techniques can be modified to bias toward the one or more terms. As a result, these terms can be prioritized over other terms that may be considered candidates when interpreting a spoken utterance. For instance, a spoken utterance such as, "Assistant, show the reviews," can be processed using ASR and result in the words "renew" and "review" being candidate terms. However, as result of the biasing toward the synonymous terms (e.g., "review"), the word "review" can be prioritized over the word "renew," thereby allowing the automated to more accurately respond to spoken utterances associated with the application.

The method 400 can proceed from the optional operation 406, or the operation 404, to an operation 408. The operation 408 can include determining whether a spoken utterance referring to the feature of the application interface has been received. When the spoken utterance is not determined to have been received, the method 400 can return to the operation 402 for determining whether the user is still accessing the application interface. Otherwise, when the spoken utterance (e.g., "Assistant, show me ratings.") is determined to have been received, the method 400 can proceed from the operation 408 to an operation 410. The automated assistant can determine that the spoken utterance refers to the feature of the application interface when the one or more terms synonymous with the feature are identified in the natural language content of the spoken utterance. For instance, the feature can be link to a "reviews" page of a computer shopping application, and the synonymous terms can include "review(s), feedback, comment(s), and rating(s)." Therefore, when the user provides the spoken utterance, "Assistant, show me ratings," while accessing the application interface, the method 400 can proceed to the operation 410.

The operation 410 can include determining a type of input for providing to an operating system for interacting with the feature of the application interface. The operating system can be installed at a computing device that is rendering the application interface and/or providing access to the automated assistant. In some implementations, the user can provide an input (e.g., a touch input) to an interface of the computing device to control the feature of the application. Operational data corresponding to the input can be processed by the operating system in order to control the feature of the application according to the input from the user. The type of input identified at the operation 410 can be one that causes the generation of the operational data that is provided to the operating system for controlling the feature of the application.

The method 400 can proceed from the operation 410 to an operation 412, which can include causing the operating system to interact with the particular feature of the application interface. For example, by providing the determined type of input to the operating system, the operating system can issue a command to the application for controlling the particular feature in accordance with the type of input. For instance, when the user provides the spoken utterance, "Assistant, show me ratings," the automated assistant can identify a type of input that can be provided to the operating system to cause the operating system control select a "reviews" page of the computing shopping application.

Figure 5:
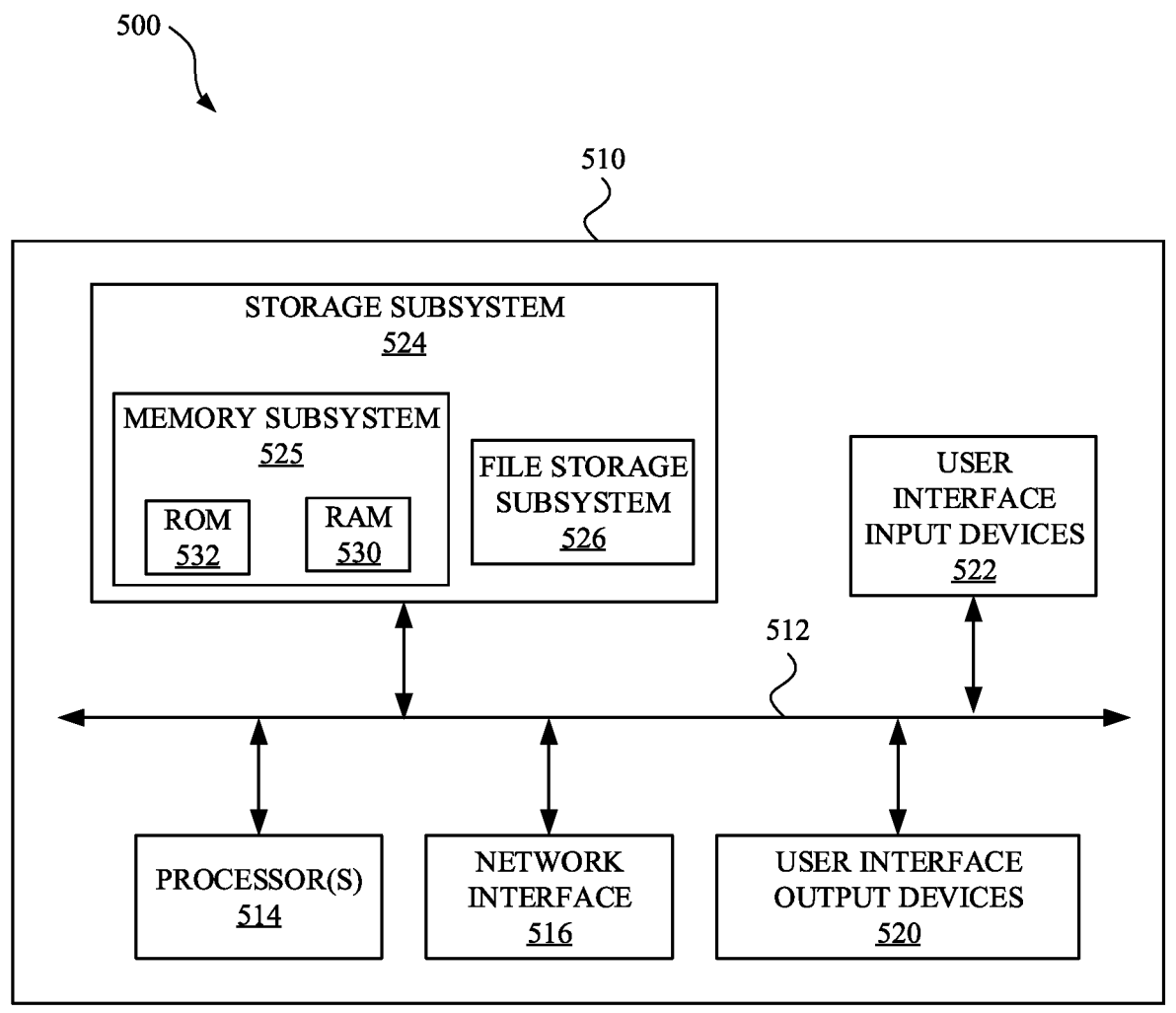
FIG. 5 is a block diagram of an example computer system.

FIG. 5 is a block diagram 500 of an example computer system 510. Computer system 510 typically includes at least one processor 514 which communicates with a number of peripheral devices via bus subsystem 512. These peripheral devices may include a storage subsystem 524, including, for example, a memory 525 and a file storage subsystem 526, user interface output devices 520, user interface input devices 522, and a network interface subsystem 516. The input and output devices allow user interaction with computer system 510. Network interface subsystem 516 provides an interface to outside networks and is coupled to corresponding interface devices in other computer systems.

User interface input devices 522 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 510 or onto a communication network.

User interface output devices 520 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 510 to the user or to another machine or computer system.

Storage subsystem 524 stores programming and data constructs that provide the functionality of some or all of the modules described herein. For example, the storage subsystem 524 may include the logic to perform selected aspects of method 400, and/or to implement one or more of system 300, computing device 104, computing device 204, automated assistant, and/or any other application, device, apparatus, and/or module discussed herein.

These software modules are generally executed by processor 514 alone or in combination with other processors. Memory 525 used in the storage subsystem 524 can include a number of memories including a main random access memory (RAM) 530 for storage of instructions and data during program execution and a read only memory (ROM) 532 in which fixed instructions are stored. A file storage subsystem 526 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 526 in the storage subsystem 524, or in other machines accessible by the processor(s) 514.

Bus subsystem 512 provides a mechanism for letting the various components and subsystems of computer system 510 communicate with each other as intended. Although bus subsystem 512 is shown schematically as a single bus, alternative implementations of the bus subsystem may use multiple busses.

Computer system 510 can be of varying types including a workstation, server, computing cluster, blade server, server farm, or any other data processing system or computing device. Due to the ever-changing nature of computers and networks, the description of computer system 510 depicted in FIG. 5 is intended only as a specific example for purposes of illustrating some implementations. Many other configurations of computer system 510 are possible having more or fewer components than the computer system depicted in FIG. 5.

In situations in which the systems described herein collect personal information about users (or as often referred to herein, "participants"), or may make use of personal information, the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

In some implementations, a method implemented by one or more processors is set forth as including operations such as determining, by an automated assistant, that a user is accessing an application interface of an application that is different from the automated assistant, wherein the application interface is rendered at a display interface of a computing device and the computing device provides access to the automated assistant. The method can further include identifying, by the automated assistant, one or more terms that are synonymous with a particular feature of the application interface of the application. The method can further include receiving, from the user, a spoken utterance that includes a particular term of the one or more terms identified by the automated assistant, wherein the particular term is not expressly rendered in the application interface. The method can further include determining, based on having identified the particular term as being synonymous with the particular feature, to control the application using a type of input that can be received by an operating system of the computing device for interacting with the particular feature of the application interface. The method can further include causing, by the automated assistant and in response to the spoken utterance, the operating system to interact with the particular feature of the application interface.

In some implementations, the method can further include processing, in response to receiving the spoken utterance, audio data that corresponds to the spoken utterance, wherein the processing is performed with a bias towards the one or more terms that are synonymous with the particular feature of the application interface. In some implementations, identifying the one or more terms that are synonymous with the particular feature of the application interface of the application includes: determining, based on application data associated with the application interface, that the particular feature of the application interface is selectable via a user input to the operating system of the computing device. In some implementations, identifying the one or more terms that are synonymous with the particular feature of the application interface of the application includes: determining that the user has invoked, using a previous spoken utterance, the automated assistant to control another feature of a separate application, wherein the previous spoken utterance identifies the one or more terms, and the other feature of the separate application is associated with the particular feature of the application.

In some implementations, the particular feature includes a term label that is also included in the other feature, and the term label is different than the one or more terms. In some implementations, the spoken utterance is provided by the user in a first natural language, and content is rendered at the application interface in a second natural language that is different than the first natural language. In some implementations, the automated assistant is responsive to inputs in the first natural language as indicated by a user-controllable setting of the automated assistant. In some implementations, identifying the one or more terms that are synonymous with the particular feature of the application interface of the application includes: processing one or more images that capture natural language content corresponding to the particular feature of the application interface, wherein the one or more terms are synonymous with the natural language content.

In other implementations, a method implemented by one or more processors is set forth as including operations such as determining, at a computing device, that an application interface of an application is being rendered at a display interface of the computing device, wherein the application is different from an automated assistant that is accessible via the computing device. The method can further include processing, based on the application interface being rendered at the display interface, application data associated with content that is being rendered at the application interface of the application. The method can further include generating, based on the processing of the application data, operation data that indicates a correspondence between a feature the application interface and an operation capable of being performed, by the automated assistant, to effectuate control of the application. The method can further include receiving, from a user, an input that is directed to the automated assistant, wherein the input is embodied in a spoken utterance that is provided by the user to an audio interface of the computing device. The method can further include determining, based on receiving the input, that the input refers to the operation for interacting with the feature of the application interface. The method can further include causing, in response to receiving the input, the automated assistant to initialize performance of the operation for interacting with the feature of the application interface.

In some implementations, the spoken utterance is provided by the user in a first natural language, and the content is rendered at the application interface in a second natural language that is different than the first natural language. In some implementations, the automated assistant is responsive to inputs in the first natural language as indicated by a user-controllable setting of the automated assistant. In some implementations, determining that the input refers to the operation for interacting with the feature of the application interface includes: determining to bias a speech processing operation according to the operation data, and causing the speech processing operation to be performed on audio data that characterizes the spoken utterance provided by the user. In some implementations, causing the automated assistant to initialize performance of the operation includes: causing the automated assistant to communicate with an operating system of the computing device to cause the operating system to issue a control command to the application for controlling the feature of the application interface. In some implementations, processing content of the application interface includes processing one or more images corresponding to a screenshot of the application interface.

In yet other implementations, a method implemented by one or more processors is set forth as including operations such as determining, at a computing device, that a user is accessing an application interface of an application that is different from an automated assistant, wherein the computing device provides access to the automated assistant and the application. The method can further include identifying, by the automated assistant, one or more terms rendered at the application interface that correspond to an operation capable of being performed by the application, wherein the one or more terms are rendered in a language that is different from a responsive language of the automated assistant. The method can further include determining, by the automated assistant, one or more other terms that are not expressly rendered at the application interface of the application, wherein the one or more other terms are in the responsive language of the automated assistant and are synonymous with the one or more terms rendered at the application interface. The method can further include receiving, by the automated assistant and from the user, a spoken utterance that includes the one or more other terms, wherein the spoken utterance is received in the responsive language of the automated assistant while the computing device is rendering at the application interface of the application. The method can further include causing, in response to the spoken utterance and by the automated assistant, the application to initialize performance of the operation corresponding to the one or more terms.

In some implementations, identifying the one or more terms rendered at the application interface that correspond to the operation capable of being performed by the application includes: processing application data that is executed by an operating system of the computing device for rendering the application interface at a display interface of the computing device. In some implementations, identifying the one or more terms rendered at the application interface of the application includes: determining, based on application data associated with the application interface, that the operation of the application is controllable via a user input to the operating system of the computing device. In some implementations, causing the automated assistant to initialize performance of the operation includes: causing the automated assistant to communicate with an operating system of the computing device to cause the operating system to issue a control command to the application for controlling the feature of the application interface. In some implementations, the method can further include, prior to receiving the spoken utterance, determining to bias a speech processing operation according to the one or more other terms that are synonymous with the one or more terms rendered at the application interface. In some implementations, the operation includes executing a link that causes different content to be rendered in the language at the application interface.

We claim:

1. A computing device comprising:
a display interface;
one or more microphones;
memory storing instructions;
one or more processors operable to execute the instructions to cause an automated assistant of the computing device to:
determine that a user is accessing an application interface of an application that is different from the automated assistant,
wherein the application interface is rendered at the display interface;
identify one or more terms that are synonymous with a particular feature of the application interface of the application;
receive, via one or more of the microphones, a spoken utterance that includes a particular term of the one or more terms that are synonymous with the particular feature of the application interface of the application
wherein the particular term is not expressly rendered in the application interface of the application;
determine, based on having identified the particular term as being synonymous with the particular feature, to control the application using a type of input for interacting with the particular feature of the application interface; and
cause, in response to the spoken utterance and in response to determining to control the application using the type of input, interaction that is with the particular feature of the application interface and that uses the type of input.

2. The computing device of claim 1, wherein one or more of the processors are further operable to execute the instructions to cause the automated assistant to:
process, in response to receiving the spoken utterance, audio data that corresponds to the spoken utterance,
wherein the processing is performed with a bias towards the one or more terms that are synonymous with the particular feature of the application interface, and is performed with the bias in response to identifying the one or more terms as synonymous with the particular feature of the application interface.

3. The computing device of claim 1, wherein in identifying the one or more terms that are synonymous with the particular feature of the application interface of the application one or more of the processors are to:
determine, based on application data associated with the application interface, that the particular feature of the application interface is selectable via a user input to the computing device.

4. The computing device of claim 1, wherein in identifying the one or more terms that are synonymous with the particular feature of the application interface of the application one or more of the processors are to:
determine that the user has invoked, using a previous spoken utterance, the automated assistant to control another feature of a separate application,
wherein the previous spoken utterance identifies the one or more terms, and the other feature of the separate application is associated with the particular feature of the application interface.

5. The computing device of claim 4, wherein the particular feature includes a term label that is also included in the other feature, and the term label is different than the one or more terms.

6. The computing device of claim 1, wherein the spoken utterance is provided by the user in a first natural language, and content is rendered at the application interface in a second natural language that is different than the first natural language.

7. The computing device of claim 6, wherein the automated assistant is responsive to inputs in the first natural language as indicated by a user-controllable setting of the automated assistant.

8. The computing device of claim 1, wherein in identifying the one or more terms that are synonymous with the particular feature of the application interface of the application one or more of the processors are to:

process one or more images that capture natural language content corresponding to the particular feature of the application interface, wherein the one or more terms are synonymous with the natural language content.

9. A computing device comprising:

a display interface;

one or more microphones;

memory storing instructions;

one or more processors operable to execute the instructions to cause an automated assistant of the computing device to:

determine that an application interface of an application is being rendered at the display interface, wherein the application is different from the automated assistant;

process, based on the application interface being rendered at the display interface, application data associated with content that is being rendered at the application interface of the application;

generate, based on the processing of the application data, operation data that indicates a correspondence between a feature of the application interface and an operation capable of being performed, by the automated assistant, to effectuate control of the application;

receive an input that is directed to the automated assistant and that is embodied in a spoken utterance detected via one or more of the microphones;

determine, based on receiving the input, that the input refers to the operation for interacting with the feature of the application interface; and in response to receiving the input and based on determining that the input refers to the operation for interacting with the feature of the application interface:

initialize performance of the operation for interacting with the feature of the application interface.

10. The computing device of claim 9, wherein the spoken utterance is provided by the user in a first natural language, and the content is rendered at the application interface in a second natural language that is different than the first natural language.

11. The computing device of claim 10, wherein the automated assistant is responsive to inputs in the first natural language as indicated by a user-controllable setting of the automated assistant.

12. The computing device of claim 9, wherein in determining that the input refers to the operation for interacting with the feature of the application interface one or more of the processors are to:

determine to bias a speech processing operation according to the operation data, and cause the speech processing operation to be performed on audio data that characterizes the spoken utterance provided by the user.

13. The computing device of claim 9, wherein in initializing performance of the operation one or more of the processors are to:

communicate with an operating system of the computing device to cause the operating system to issue a control command to the application for controlling the feature of the application interface.

14. The computing device of claim 9, wherein in processing application data associated with content that is being rendered at the application interface of the application one or more of the processors are to process one or more images corresponding to a screenshot of the application interface.

15. A computing device comprising:

a display interface;

one or more microphones;

memory storing instructions;

one or more processors operable to execute the instructions to cause an automated assistant of the computing device to:

determine that a user is accessing an application interface of an application that is different from the automated assistant;

identify one or more terms that are rendered at the application interface and that correspond to an operation capable of being performed by the application, wherein the one or more terms are rendered in a language that is different from a responsive language of the automated assistant; determine one or more other terms that are not expressly rendered at the application interface of the application, and wherein the one or more other terms are in the responsive language of the automated assistant and are synonymous with the one or more terms rendered at the application interface;

receive, via the one or more microphones, a spoken utterance that includes the one or more other terms, wherein the spoken utterance is received in the responsive language of the automated assistant while the computing device is rendering the application interface of the application; and cause, in response to the spoken utterance, the application to initialize performance of the operation corresponding to the one or more terms.

16. The computing device of claim 15, wherein in identifying the one or more terms that are rendered at the application interface and that correspond to the operation capable of being performed by the application one or more of the processors are to:

process application data that is executed by an operating system of the computing device for rendering the application interface at the display interface.

17. The computing device of claim 15, wherein in identifying the one or more terms that are rendered at the application interface and that correspond to the operation capable of being performed by the application one or more of the processors are to:

determine, based on application data associated with the application interface, that the operation of the application is controllable via a user input to the operating system of the computing device.

18. The computing device of claim 15, wherein in causing the application to initialize performance of the operation one or more of the processors are to:

communicate with an operating system of the computing device to cause the operating system to issue a control command to the application for causing performance of the operation.

19. The computing device of claim 15, wherein one or more of the processors are further operable to execute the instructions to cause the automated assistant to:

prior to receiving the spoken utterance:

determine to bias a speech processing operation, performed on the spoken utterance, according to the one or more other terms that are synonymous with the one or more terms rendered at the application interface.

20. The computing device of claim 15, wherein the operation includes executing a link that causes different content to be rendered in the language at the application interface.

\*    \*    \*    \*    \*